No. 630,233. Patented Aug. 1, 1899.
M. HUTIN & M. LEBLANC.
REGULATING ALTERNATING CURRENT DYNAMO ELECTRIC MACHINES.
(Application filed Apr. 10, 1897.)
(No Model.) 4 Sheets—Sheet 2.
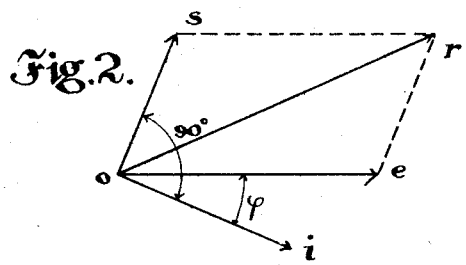
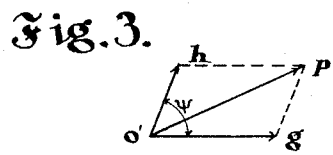
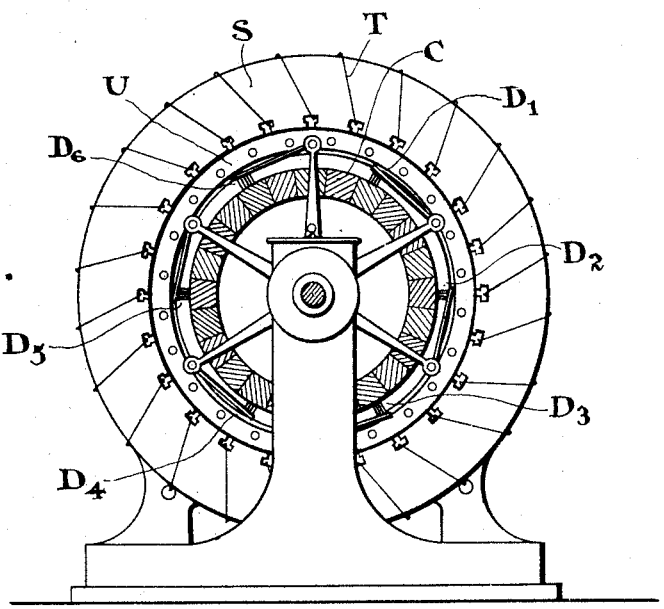
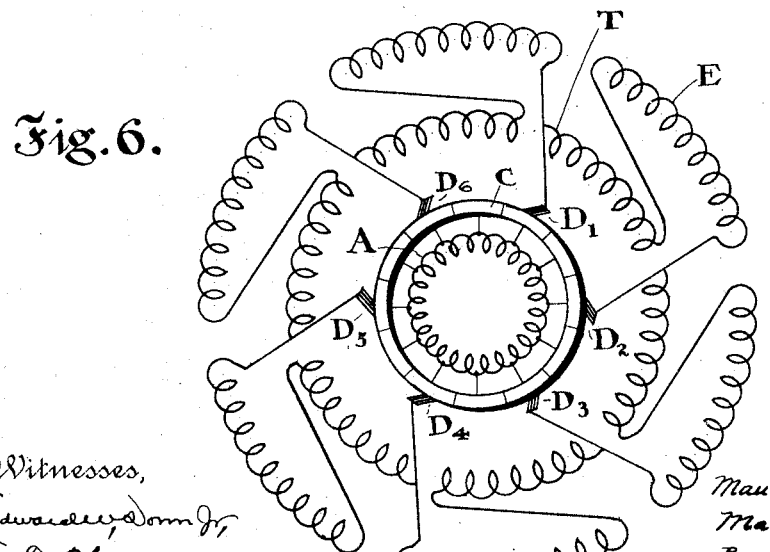
THE NORRIS PETERS CO., PHOTO-LITHO., WASHINGTON, D. C.

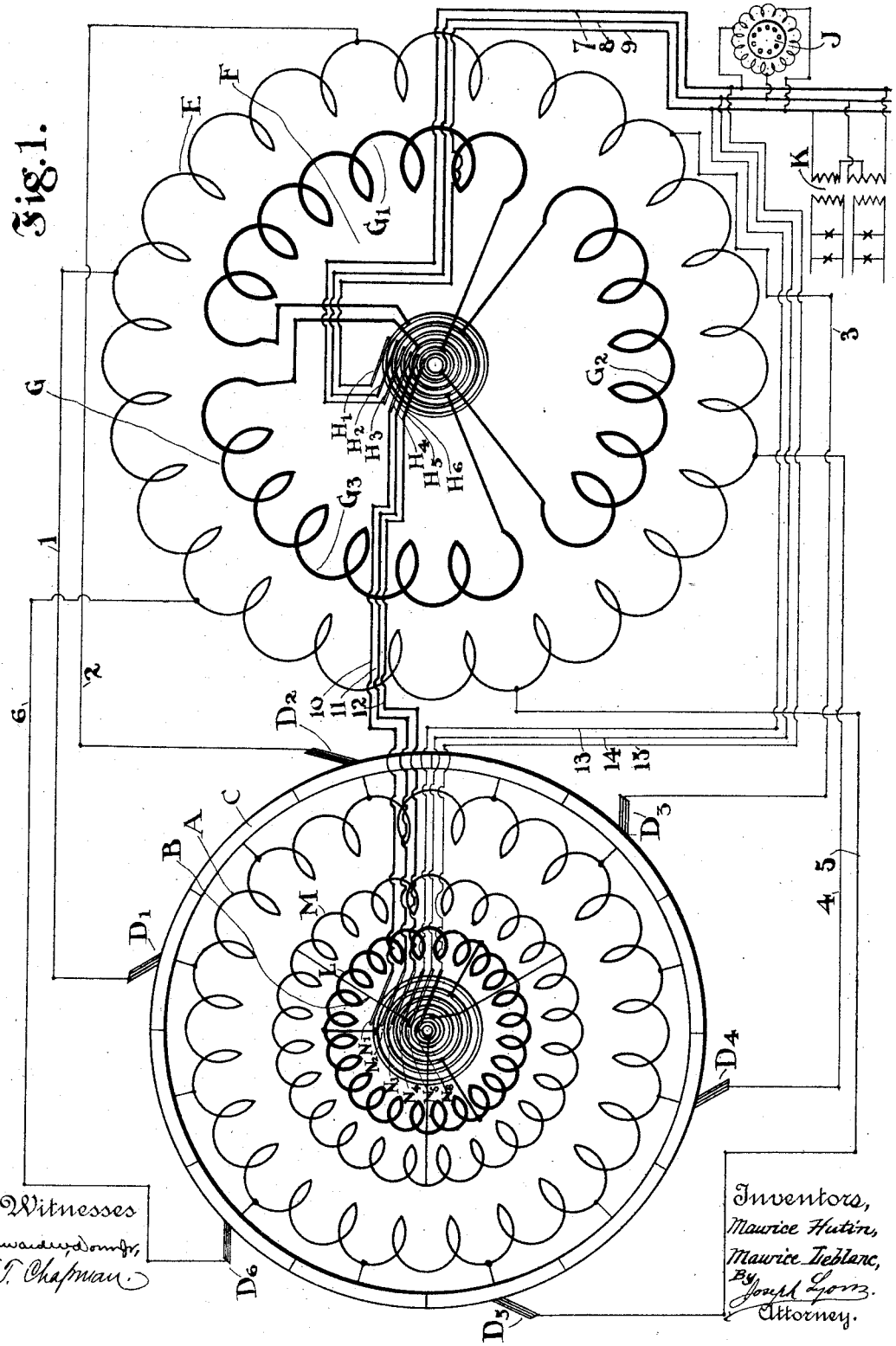

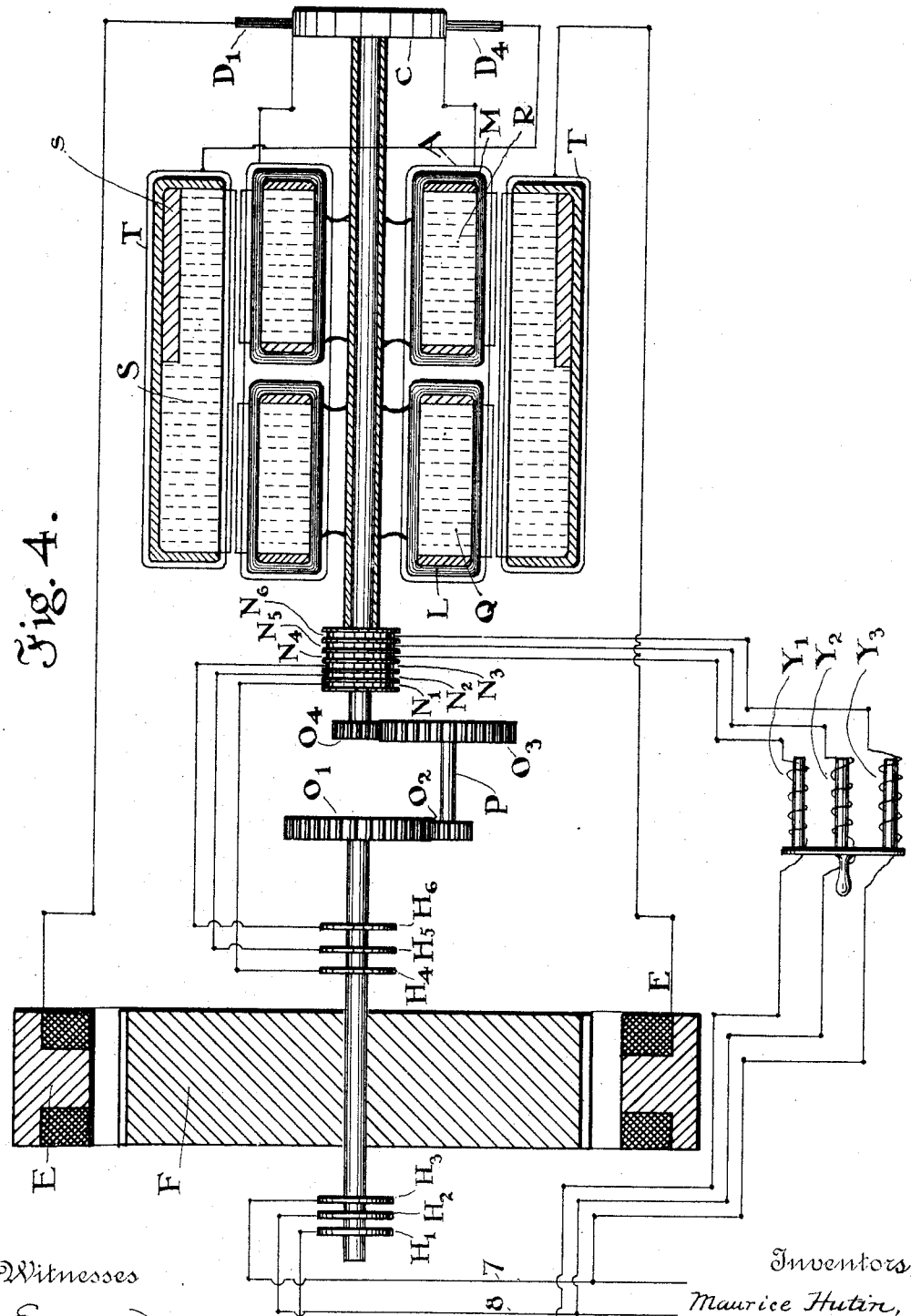

No. 630,233. Patented Aug. 1, 1899.
M. HUTIN & M. LEBLANC.
REGULATING ALTERNATING CURRENT DYNAMO ELECTRIC MACHINES.
(Application filed Apr. 10, 1897.)
(No Model.) 4 Sheets—Sheet 4.
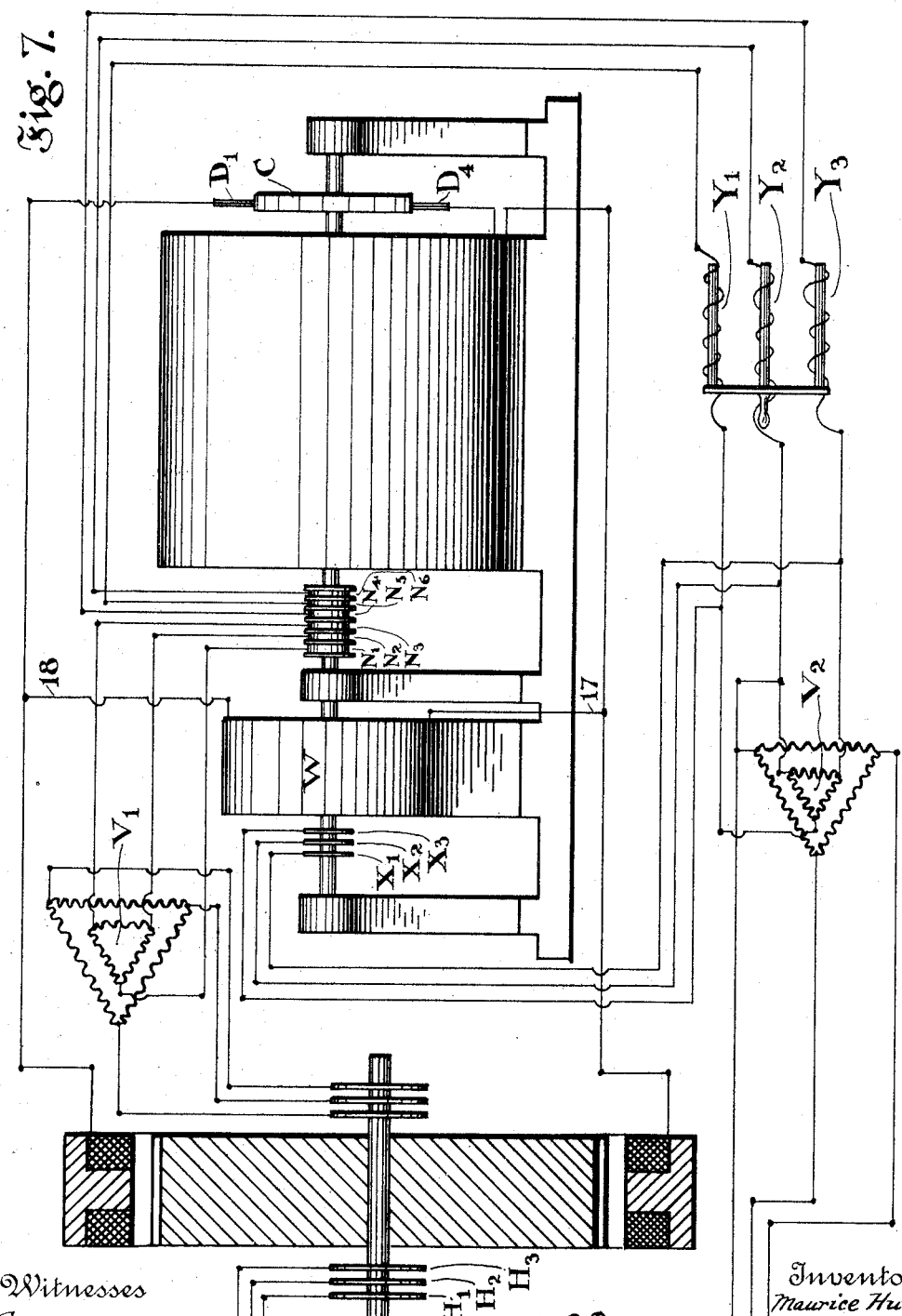

United States Patent Office.

MAURICE HUTIN AND MAURICE LEBLANC, OF PARIS, FRANCE, ASSIGNORS TO THE SOCIÉTÉ ANONYME POUR LA TRANSMISSION DE LA FORCE PAR L'ELÉCTRICITÉ, OF SAME PLACE.

REGULATING ALTERNATING-CURRENT DYNAMO-ELECTRIC MACHINES.

SPECIFICATION forming part of Letters Patent No. 630,233, dated August 1, 1899.

Application filed April 10, 1897. Serial No. 631,626. (No model.)

*To all whom it may concern:*

Be it known that we, MAURICE HUTIN and MAURICE LEBLANC, citizens of the Republic of France, and residents of Paris, France, have invented certain new and useful Improvements in Alternating-Current Dynamo-Electric Machinery, of which the following is a specification, and for which Letters Patent have been granted as follows: in France, dated May 27, 1896, No. 256,722; in Belgium, dated October 3, 1896, No. 123,847, and in Italy, dated October 7, 1896, No. 42,808.

Our invention relates to alternating-current dynamo-electric machinery and the excitation thereof, and has for its object to provide a method of and means for exciting alternating-current dynamo-electric machines of all types in such a manner as to produce a proper regulation under all the varying conditions of load met with in practice and at the same time to allow the machines to be designed in such a manner as to secure a maximum output in proportion to the weight of iron and copper employed. We accomplish these ends by the use of our improved exciter, which is so constructed and arranged that its voltage varies in such a manner as to compensate for the variations of load and of inductance on the main circuit and to maintain a constant voltage at the brushes of the main machine.

Our improved exciter may also be so designed as to produce an overcompounding action, if so desired—that is to say, as to maintain a constant voltage at any desired point on the main circuit.

Our improved exciter also aids in the coupling of generators and motors in multiple and in the speed regulation of motors and serves to prevent motors from taking idle current from the line and also accomplishes other useful ends to be hereinafter more specifically described.

It is known that in order to construct an alternator to yield the maximum output for a given weight of copper and iron, with a given loss of electrical energy in the copper and with a given maximum peripheral velocity of its rotor, the copper should be equally divided between the fixed and moving parts and the air-gap should be the smallest that is mechanically permissible. A machine so constructed if set to work as a generator on a constant-potential circuit will exhibit a considerable armature reaction and will drop in pressure at its terminals as the load comes on—in other words, will regulate badly. To overcome this difficulty, most constructors of electrical machinery sacrifice the conditions of maximum output for a given weight of material in order to obtain good regulation of pressure by employing a much greater number of ampere-turns upon the field than upon the armature. They even go to the extent of using a wide air-gap regardless of the energy which must be expended in forcing the magnetic flux across it and are satisfied with such designs if they produce a generator which regulates well under load. It has appeared to us, however, that it should be possible to secure good regulation in a less expensive manner, and we are able to obtain in generators built and excited according to our invention a maximum output for the weight of materials employed and at the same time better regulation than is found in the best commercial generators. We accomplish these ends by automatically varying the exciting-current by means of our improved exciter, which responds both to changes of volume and of lag in the current of the main machine. In this manner we effect a considerable saving in cost and add to rather than detract from the regulation.

Alternators may be divided into two classes, according to the manner in which their field-magnets are excited.

First. Those in which the field is excited by a continuous current from an external source. Assuming that the stator is the field-magnet, the magnetic poles and flux remain stationary and fixed in space and the armature is revolved relatively to them. If there are $n$ pairs of poles and the armature makes $\omega$ revolutions per second, the frequency of the electromotive force at the armature-terminals will be $n\omega$ periods per second.

Second. Those in which the field is excited by alternating currents supplied usually through a plurality of circuits either from a separate source or from the main circuit by induction or otherwise. Where the exciting-currents are multiphase in character, the magnetic flux due to the field-magnets rotates around the field-frame with a speed of, say, $\alpha$ revolutions per second. This will evidently, if the armature is at rest, generate in the armature-coils electromotive forces having a frequency of $\alpha$ periods per second. In the most general cases mechanical rotation may be superposed on the magnetic rotation, when the resultant frequency of the generated electromotive forces will be $\frac{1}{T} = \alpha \pm n \omega$ revolutions per second, according to the relative directions of rotation.

Machines of the first type may be termed "synchronous" machines, while those of the second type may be termed "asynchronous" machines. There is, of course, a third type of alternating generators, those of the "sympathetic" type, which consist simply of induction-motors driven above synchronism. This type falls under the second class above mentioned and need not be further considered here.

Although the means adopted to produce the relative rotary motion between armature-conductors and magnetic flux are mechanical in synchronous machines and electrical or at least partly electrical in asynchronous machines, yet any method of producing relative rotation of magnetic flux and conductors is applicable to both types alike, and from this point of view a synchronous machine with direct-current excitation may be regarded as only a particular case of the general type represented by asynchronous machines—that is to say, the case when $\alpha$ becomes zero.

Our method of excitation is applicable to both synchronous and asynchronous machines because it partakes of the character of both. Under the most general conditions an alternator with our improved exciter is an asynchronous alternator, while in particular cases it becomes a synchronous alternator.

In the drawings attached to this specification, Figure 1 is a diagram showing our improved exciter connected to an alternating generator. Figs. 2 and 3 are diagrams showing the phase relations and magnitudes of the electromotive forces, &c., in the alternator and the exciter. Fig. 4 shows the exciter in cross-section with its electrical and mechanical connections to a synchronous multipolar alternator. Fig. 5 is an end view of an exciter adapted to furnish current to an asynchronous alternator. Fig. 6 is a diagram showing the compensating-circuits of the exciter. Fig. 7 shows the exciter driven by a small synchronous motor.

Referring to Fig. 1, let A represent a ring-winding of the Gramme type, forming the generating-winding of the exciter B, connected at suitable intervals with the segments of a commutator C, on which bear brushes $D' D^2 D^3 D^4 D^5 D^6$. These brushes are connected by the wires 1 2 3 4 5 6 with the field-winding E of the alternating generator F.

G is the armature-winding of the alternator, shown as composed of three symmetrical coils $G' G^2 G^3$, connected through the rings and brushes $H' H^2 H^3$ with the external circuit 7 8 9, containing various translating devices, as the motor J and the transformer K.

In inductive relation to the winding A of the exciter B are two windings L and M, one in series with the armature G and one in shunt, as will be hereinafter more fully set forth. The winding L is shown as of the ring type, connected at three equidistant points with the rings and brushes $N' N^2 N^3$, which in turn are connected through the wires 10 11 12 and brushes $H^4 H^5 H^6$ with the armature-coils $G' G^2 G^3$. It will be seen that this winding is in series with the armature G. The winding M is also tapped at three equidistant points and connected through the brushes $N^4 N^5 N^6$ and the wires 13 14 15 with the mains 7 8 9. This winding is then in multiple with the armature of the alternator. Both of these windings L and M are so situated as to revolve with the generating-winding A, as will be more fully set forth below.

Suppose the alternator to be running. It is evident that three-phase currents will flow in the winding M, producing a polar line rotating at the rate of $\alpha$ revolutions per second, if $\alpha$ is the frequency of the currents in the main circuit. Under these conditions if the exciter remains at rest alternating currents will be delivered to the wires 1 2 to 6, connected to the brushes $D' D^2$ to $D^6$ of a frequency $\alpha$ and dephased successively by one-sixth of a period. If, however, the exciter be revolved relatively to the brushes with a speed of $\alpha$ revolutions per second and in a direction opposite to the rotation of the field generated by the winding M, the polar line will be fixed in space, though rotating relatively to the winding A, and continuous currents will flow in the exciter-circuits with strengths which will differ from circuit to circuit, depending in each case on the position of the particular brush with relation to the polar line. The action then is very similar to that which would occur in the armature of a bipolar direct-current generator provided with six brushes.

If the magnetic flux instead of rotating under the influence of triphase electric currents be stationary, then the rotation of the winding A relatively to the flux will generate continuous currents, as before, but this will now be the case at any speed of rotation instead of only at the particular speed $\alpha$, as in the previous case.

An exciter such as is diagrammatically represented in Fig. 1 is suitable for supplying a triphase alternator of the asynchronous type, as it will furnish continuous or alternating currents, according to the speed of relative rotation between its brushes and its commutator. If, however, the alternator be of the synchronous type, then but a single pair of brushes—say D' and D⁴—will be required on the exciter-commutator. Such an exciter is shown in Fig. 4.

If the triphase alternator has $n$ pairs of poles, the exciter is so geared to it as to run with a speed $n$ times as great. A triphase generator of twenty poles whose armature makes six revolutions per second will generate a current of sixty periods per second. Such a current admitted to the winding M will produce a bipolar magnetic flux making sixty revolutions per second around both the windings A and M. At the same time if the exciter-rotor is geared to rotate ten times faster than the armature of the alternator it will make sixty revolutions per second in the opposite direction, thereby leaving the magnetic flux stationary in space, so that continuous currents are generated in the external circuits of the exciter—that is to say, in the field-circuits of the alternator.

If the alternator be single-phase instead of polyphase, uniphase currents will be admitted to the winding M at a pair of opposite points instead of triphase currents at triangular points. These uniphase currents, of a frequency of $\frac{1}{T}$ periods per second, will produce an alternating field which may be considered as a resultant of two equal magnetic fields rotating in opposite directions with the velocity $\frac{1}{T}$ revolutions per second around the windings A and M. When the exciter-rotor is revolved at a speed of $n\omega$ revolutions per second, the resulting speeds of these magnetic fluxes in space will be $\frac{1}{T} - n\omega$ and $\frac{1}{T} + n\omega$, respectively. The former will be either zero or very small and the latter will be practically $2n\omega$. If now we revolve the exciter-rotor within a conducting-cage fixed in space—such, for instance, as that illustrated in our United States Patent No. 529,272, dated November 13, 1894—the former flux would be practically unimpeded, while the latter, having a high speed with relation to the conducting-cage, would be practically suppressed. An exciter provided with such a cage is shown in Fig. 5.

In Fig. 1 the exciter-rotor is diagrammatically represented as having but two poles. It is obvious, however, that it may be wound to have $m$ pairs of poles. This may be accomplished in any of the well-known ways. The brushes on the commutator of the Gramme-ring winding must be correspondingly distributed according to the rules of continuous-current generators. In such a case the gearing of the exciter-rotor must be $\frac{n}{m}$ instead of $n$ with relation to the alternator-rotor. The exciter is therefore capable of exciting any type of alternating-current machines. If the machine be uniphase, the winding M is uniphase. If the machine be polyphase, the winding M is also polyphase. If the machine be a synchronous one having but a single field-exciting circuit, a single pair of brushes is employed on the exciter-commutator. If the machine be asynchronous, with a plurality of exciting-circuits, a corresponding number of brushes is employed on the exciter-commutator. If the exciter be supplied with alternating currents of the frequency produced by the alternator to which it is connected and driven at the speed above set forth—that is to say, in synchronism with those currents—the resultant flux in the exciter is fixed in space, and it supplies continuous currents to the alternator-field. If, on the other hand, either the speed of rotation of the exciter or the frequency of the alternating currents supplied thereto be changed, the resultant flux in the exciter rotates, and alternating currents are supplied to the field of the main generator, which then acts as an asynchronous machine; but it is evident that the actions thus far considered will develop in the generating-circuit of the exciter a current whose voltage and volume will depend solely on the voltage of the current in the line. In order to provide the compounding, we must secure another effect depending in its intensity on the amount and character of the load on the generator. This we provide by the series winding L.

The problem is to vary the magnitude of the flux acting on the coil A in such a manner that the voltage at any selected point in the main circuit—as, for instance, at the terminals of the generator—will remain constant. As we are considering alternators designed for a maximum output whose armatures have a considerable self-induction, the armature-resistance is negligible in comparison with its reactance, though our improved exciter will when properly designed and adjusted compensate for both.

Let us suppose that the line $o\,e$ in Fig. 2 represents in magnitude and phase on any suitable scale the potential difference which it is desired to maintain between the extremities of each circuit of the alternator-armature and that $o\,i$ represents in the same manner the armature-current lagging by the angle $\varphi$. The line $o\,s$, bearing some constant relation to $o\,i$, depending on the particular machine, and ninety degrees in advance of $o\,i$, will represent the electromotive force which is consumed in the alternator-windings by reactance and armature reaction, so that the resultant $o\,r$ is the electromotive force which must be actually generated in the windings of the armature. In other words, $o\,r$ is the internal electromotive force, $o\,e$ is the terminal voltage, and $o\,s$ is the electromotive force necessary to overcome the counter electromotive forces in the armature. If $o\,e$ is to remain constant under all conditions of load—that is to say, if the pressure at the armature-terminals is to be constant, no matter what may be the magnitude or phase of the current $o\ i$—the internal electromotive force $o\ r$ must be automatically adjusted to produce the right value of the component $o\ s$, which overcomes the reactance and reaction of the alternator-armature. We accomplish this result by giving the field-magnets of the armature a current proportional to the required resultant $o\ r$, supposing the field-magnets of the alternator to be worked well below saturation, so that their flux is fairly proportional to their exciting-current. If this latter condition is not met, there must be additional compensation.

This regulation of the exciting-current may be accomplished by the series winding L. In Fig. 3 let $o'\ g$ represent the flux in the exciter due to the shunt-winding M and $o'\ h$ the flux due to the series winding L. The magnitudes of these fluxes under any particular conditions of voltage and load may be fixed by suitably proportioning the windings, while the phase difference $\Psi$ may be adjusted by making the connections from the rings to the series coil L at the proper points. The angle $\Psi$—that is to say, the angle between the two magnetic fluxes due to the shunt and series field-windings, respectively, of the exciter—must be the complement of the angle $\varphi$—that is to say, of the angle of lag indicated in Fig. 2. Consequently, normally when $\varphi$ is to be zero $\Psi$ must be ninety degrees, and one way of accomplishing this is by tapping the shunt-winding M at points which are ninety degrees from the tapping-points of the series winding L. This construction is indicated in Fig. 1. If now two alternating currents which are in phase with each other traverse the shunt and series winding, respectively, we may for convenience merely speak of this as the normal condition. The two fluxes produced by them, whether rotary or not, will be in quadrature, so that the electromotive forces which produce them may be said to be normally acting in quadrature. But if the series current lags the angle between the two fluxes will be less than ninety degrees, but always equal to the complement of the lag—that is to say, equal to the angle $s\ o\ e$ in Fig. 2. We design the circuits so that $\dfrac{o'\ g}{o\ e} = \dfrac{o'\ h}{o\ s}$.

It follows that $o'\ p$ is always proportional to $o\ r$, as is evident from the geometry of the figures, and therefore the flux in the exciter, and consequently the currents in the wires 1 2 to 6 and the excitation of the alternator, must be directly proportional to the vector $o\ r$, which, as we have above shown, represents the internal electromotive force which the generator should have for proper regulation. The problem is thus solved.

In order to illustrate the mechanical construction which we prefer to use, we have shown in Fig. 4 our improved exciter connected electrically and mechanically to a multiphase synchronous generator B. Fig. 5 shows in an end elevation a similar exciter arranged to feed an asynchronous generator. The only difference between these two exciters is that the one which feeds the asynchronous generator is provided with several pairs of brushes. It also shows a flux-screen.

In Fig. 4, E is the field-magnet of B and F the armature, while on the shaft are shown the rings $H'\ H^2\ H^3$, leading to the external circuit 7 8 9, as in Fig. 1. The rings $H^4\ H^5\ H^6$ are connected to the rings $N'\ N^2\ N^3$ of the exciter, while the exciter-rings $N^4\ N^5\ N^6$ are connected to the armature-circuit of the alternator.

The exciter is driven from the alternator by the gear-wheels $O'\ O^2\ O^3\ O^4$, acting through the shaft P. The gears are so arranged that the speed of the exciter is to that of the generator as the number of polar lines of the generator is to the number of polar lines of the exciter. Though we have shown a mechanical gearing, it will be understood that we are not restricted thereto, but we may use any method that will insure that the exciter will run at the proper speed. We may, for instance, drive it by a small synchronous motor having the same number of polar lines as the exciter, as will be more fully set forth below, and though we have illustrated that form of our invention in which the exciter itself rotates and its brushes are stationary it is evident that the proper relative rotation between the exciter-commutator and its brushes is all that is required, in whatever way this may be accomplished, though we prefer at present to use the form shown.

The field-magnets E of the generator are fed from the brushes $D'\ D^4$ of the exciter, whose construction will now be described.

Q R are two Gramme-ring armatures having cores built up of sheet-iron plates or laminæ provided with superficial grooves. The grooves on the surface of Q correspond to and are in line with those on the surface of R. These rings Q R carry, respectively, the windings M and L of Fig. 1 wound in the slots referred to. As the main generator in this case is three-phase, these windings are also three-phase, as shown in Fig. 1. There are therefore three connections from L and three from M, which lead to the rings and brushes $N'\ N^2\ N^3$ and $N^4\ N^5\ N^6$, respectively. A single ring S of magnetic material is so placed as to close the magnetic circuits of the two rings Q and R. This ring S is preferably stationary. The two windings L and M are therefore electrically and mechanically separate from each other. Three-phase currents in L will set up a rotary field in the ring Q, while the three-phase currents in M will set up a rotary field in the ring R. It will be understood that the windings, connections, number of poles, &c., of these two rings may be varied in many ways. These windings L and M are both overwound by a single ring-winding A, connected to the commutator C, as shown in Fig. 1. This is the generating-winding of the exciter, which, as will be seen, is really a transformer, changing two multiphase currents into a single continuous current whose electromotive force is proportional to the vector sum of the vectors, representing in magnitude and phase the two currents, for the winding A will be acted upon by two rotary fields, and if the exciter be rotated in such a direction and at such a speed that the resultant of these two fields stand still in space a direct current may be taken off corresponding to the direct current in the system shown in Fig. 1, though in Fig. 4, as the generator B is in that case of the synchronous type, only two brushes are used, as above explained, Fig. 5, on the other hand, corresponding in this respect exactly with Fig. 1.

The action of our improved exciter is as follows: Supposing that the alternator considered is working alone on the circuit, it is started as usual by setting in motion the prime motor, which may be of any preferred type and is not shown in the drawings. The exciter starts at the same time, as it is geared to the alternator. There will always be a certain magnetism remaining in the ring S, which will develop in the winding A and in the fields of the alternator a slight current. This, with the residual magnetism of the alternator-fields, will set up an alternating current in the alternator-armature, which current will in turn strengthen the exciter-fields. The voltage of the alternator will therefore gradually rise or "build up," as it is termed, until it is checked by magnetic saturation at some point. We prefer to have this saturation take place in the shunt-field of the exciter, and attain this result by cutting away the exciter-field at the point S and preferably inserting there a non-magnetic ring, as shown. The voltage of the alternator at no load is thus determined by the number of lines of force which can exist in the magnetic circuit of the ring R under the running conditions. As the load comes on currents begin to flow in the coarser series coils L, which current is proportional to the line $o'h$ in Fig. 3. As the magnetic circuit of the ring Q is always well below the point of saturation on account of its large cross-section, the flux due to this current will also be proportional to the line $o'h$, while the flux due to the winding M will remain sensibly constant, for the reasons above stated. As we have supposed that the field-magnet of the alternator is so designed as never to be saturated at any load which the machine is intended to carry, the field excitation and internal electromotive force will be proportional to the line $o'p$ in Fig. 3, and therefore to the line $o\,r$ in Fig. 2, so that the voltage at the terminals of the brushes will be constant and proportional to $o\,e$.

If it is desired to overcompound the alternator or if its field-magnets approach the point of saturation to such an extent that their flux is not sensibly proportional to the exciting-current, additional turns must be given to the winding L. In this way the compounding may be varied to suit any conditions whatever in a manner very analogous to the compounding of direct-current generators and with the same advantages.

We have hitherto considered that the electromotive force generated by the exciter will be proportional to the resultant of the magnetomotive forces due to the two windings L and M. This assumption is not, however, always one which may be safely made, as there will be a certain armature reaction or counter magnetomotive force, due to the current in A, which will interfere with the regulation. In order to eliminate this effect, we may provide, preferably on the fixed ring of the exciter, the winding T in series with the commutator of the exciter and with the field-magnets of the alternator. The connections of this winding for an exciter for an asynchronous generator are shown in Fig. 6, in which C is the commutator, supplying the field-magnet windings E of the alternator, each section of the winding T being in series with one section of the field-magnet winding E. A is the generating-coil of the exciter, as before, the coils L and M being omitted for the sake of clearness. The ampere-turns established in the magnetic circuits of the exciter by the compensating windings T are made just sufficient to neutralize the counter magnetomotive force due to the current in the winding A.

Fig. 5 will be readily understood from what has preceded. It will be only necessary to point out that we have shown in this figure a "squirrel-cage" winding U on the stator of the exciter, designed to enable the exciter to supply a single-phase alternator, under which conditions it is preferable to feed it with single-phase currents. In this case the single-phase currents will set up two polar lines rotating in opposite directions, as explained above, and the screen or cage U will act to suppress one of these fluxes and will leave the other free to induce current in A, as explained above.

It will be evident that the electrical connections between the exciter and the armature of the generator may be inductive instead of direct, and in certain cases this is preferable. In Fig. 7 we have indicated such a connection. $V'$ and $V^2$ are two transformers, one in series with the alternator-armature and one in shunt, supplying the rings $N'\,N^2\,N^3\,N^4\,N^5\,N^6$. Otherwise the electrical connections are similar to those in Fig. 4.

The construction just described is advantageous whenever the voltage of the currents generated by the alternator is very high or very low.

It will be noticed that in all of the forms shown the only action of the winding M is to supply a field of constant intensity fixed in space with relation to the exciter-brushes when the alternator is of the synchronous type and capable of rotation with relation to the brushes when an asynchronous alternator is to be excited. It will be evident that this result may be attained in other ways, which will suggest themselves to the skilled engineer.

In Fig. 7 we have also illustrated a different way of driving the exciter. The armature of a small synchronous motor W is connected in multiple with the main circuit through the rings and brushes $X'\ X^2\ X^3$, while its fields are excited through the wires 17 18, so connected that the fields are in multiple with the field-magnets of the synchronous alternator F or in any other convenient way. This synchronous motor will start, as is well known, as the alternator starts, as it is thus supplied with currents of a small and gradually-increasing frequency, though it may not start, unless provided with some special starting device, if thrown onto a circuit of high frequency.

We have thus far supposed that the alternator to be excited was the only one on the system. If, however, the system be supplied with alternating currents from some other source before the machine represented, for instance, in Fig. 1, is connected thereto, the operation of the newly-connected machine is modified. If the shunt-winding M, Fig. 1, be connected to the system before closing the switch of the alternator, a rotary magnetic field making $\alpha$ revolutions per second will be generated in the ring R by the current received from the lines, where, as before, $\alpha$ is the line frequency. If now the alternator, which is supposed in the general case to have $n$ pairs of poles, be brought up to a speed slightly different from that of synchronism—say to $\frac{\alpha+\beta}{n}$ revolutions per second, where $\frac{\alpha}{n}$ revolutions is the speed of synchronism—the exciter-rotor will make $\alpha+\beta$ revolutions per second in one direction, while the rotary field of R makes $\alpha$ revolutions per second in the other. Consequently alternating currents of the character suitable for the production of a rotary field will be supplied from the brushes $D'\ D^2$ to $D^6$ with a differential frequency of $\beta$ periods per second. The armature or rotor of the alternator will now be running at $\frac{\alpha+\beta}{n}$ revolutions per second, while the field of the stator will move after it at the rate of $\frac{\beta}{n}$ revolutions per second. The resultant rotation between the armature of the alternator and the polar lines of its field will therefore be $\frac{\alpha+\beta}{n}-\frac{\beta}{n}=\frac{\alpha}{n}$ revolutions per second, and the armature will generate alternating currents having the frequency of $\alpha$ periods per second, the same as that already existing in the line. The armature may therefore be connected to the system. The greater the speed at which the armature is driven the greater will be the resisting torque and the greater the output. It will therefore operate as an asynchronous alternator mechanically driven above synchronism, taking more than its share of the load. If now the speed of the alternator drops, it will take less and less of the load, and finally, if the speed falls low enough, it will run as a motor. In any event it will not fall out of step. Corresponding actions will take place whatever be the number of machines feeding the system. The ones driven at the highest speed will tend to assume the greatest load, other things being equal.

It will be seen that in our exciter there are two Gramme rings side by side, one a shunt-ring and the other a series ring. Each ring produces a magnetomotive force and a magnetic field. These two magnetic fields are separate and independent and each induces a separate electromotive force in that portion of the exciter-armature connected to the commutator. As we view it the two component electromotive forces in the exciter-armature winding are summed vectorally inside the armature into a single resultant electromotive force, producing a single resultant current supplied to the fields of the alternating-current generator. It might, however, be considered that each component electromotive force produces its own electric current, these two currents being supplied to the commutator and passing into the field-magnets of the alternating-current machine. Each of these component currents would produce a component magnetomotive force and their sum a resultant magnetomotive force in the alternating-current-generator field-magnets. Should we, as we may, use our shunt and series windings on one and the same ring, thereby merging together the two initial magnetomotive forces and fluxes, there would be a vector summation of magnetomotive forces and fluxes in the exciter aside from what takes place in the alternator.

When the alternators are synchronous—that is to say, supplied with direct current only—care must be taken that each alternator is in step before it is connected into the circuit.

It is of course important that the voltages of the various machines which are coupled in parallel should be the same, though this is not perhaps as important with alternating generators as with those which produce direct current. In order to be able to adjust the voltages, we insert in the connections from the main circuit to the shunt-coil M the variable self-induction coils $Y'\ Y^2\ Y^3$, Figs. 4 and 7, in order to vary the shunt excitation.

It will be obvious that our improved system of excitation is not limited to any particular number of phases nor to any particular type of alternators and that it is applicable to motors as well as to generators. In this last use it maintains the field strength at just the proper point to prevent the motors from taking idle currents from the line, either leading or lagging. In other words, it holds the power factor at unity. Neither do we limit ourselves to the particular forms shown and described, as they may be widely varied without departing from the spirit of our invention; but What we do claim as our invention, and desire to secure by Letters Patent, is—

1. The method of exciting an alternating-current machine, which consists in charging its field circuit or circuits with currents derived from the vector sum of two electromotive forces normally at an angle, one of which is proportional to the current strength in the armature of the machine, and the other to the pressure at a predetermined point of the external circuit, substantially as described.

2. The method of regulating an alternating-current generator for constant potential at any point of the line-circuit, which consists in exciting the field of the generator, from moment to moment, under variations of load, by currents derived from the vector sum of two electromotive forces, one of which is proportional to the load and the other to the pressure at the machine-terminals, substantially as described.

3. The method of regulating an alternating-current generator for constant potential at any predetermined point of the line-circuit, and for all angles of current lag, which consists in exciting the field of the generator, from moment to moment under variations of load, by currents derived from the vector sum of two electromotive forces making a vector angle equal to the complement of the angle of lag, one of the electromotive forces being proportional to the load, and the other to the pressure at the desired point of the line, substantially as described.

4. The method of preventing an alternating-current machine from consuming or generating idle currents, which consists in automatically regulating its excitation under varying loads so as to maintain practically a zero difference of phase between the current and the electromotive force in its armature, by varying the excitation of the field-magnets so as to compensate for the drop of pressure due to the apparent impedance of the machine, by currents derived from the vector sum of two electromotive forces one of which is proportional to the current in the machine and the other to a pressure at the desired point of the external circuit, substantially as described.

5. An alternating-current machine having a relatively large amount of copper on the armature and consequent large armature reaction, in combination with an exciter delivering to the field-winding of the machine currents derived from the vector sum of two electromotive forces, one of which is proportional to the current in the armature of the machine, and the other to the pressure at a desired point in the external circuit, substantially as described.

6. The combination with an alternating-current dynamo-electric machine, of an exciter-dynamo comprising a series winding producing an independent field varying the load on the alternator, a shunt-winding producing an independent constant field, a generating-winding in inductive relation with the series winding and with the shunt-winding, and a commutator and brushes connected to said generating-winding, substantially as described.

7. An exciter-dynamo for an alternating-current dynamo-electric machine comprising two independent fields, one field being practically constant in magnitude and phase, and the other varying in magnitude and phase with the current in the alternator-armature, and a generator-winding within the inductive influence of both fields, substantially as described.

8. The combination with an alternating-current dynamo-electric machine, of an exciter driven in synchronous relation therewith, the exciter having two independent fields, one of which is practically constant and the other variable with the current in the armature of the machine and both fields excited by the armature-currents, substantially as described.

9. The combination with an alternating-current dynamo-electric machine, of an exciter driven in synchronous relation therewith, the exciter having two independent fields, the windings of one of which are in series with the armature of the machine, and the other in shunt therefrom, substantially as described.

10. An exciter-dynamo for a dynamo-electric machine comprising a shunt-winding and a series winding on two magnetic circuits of different magnetic conductivities, both energized by alternating currents and constituting two independent fields, a generating-winding under the inductive influence of both and means for collecting a current induced in the latter winding, substantially as described.

11. An exciter for a single-phase alternating-current dynamo-electric machine, comprising a shunt-winding, a series winding, a generator-winding under the inductive influence of both, means for collecting current induced in the generator-winding, and a flux-screen adapted to modify the magnetic flux induced by the shunt and series winding, substantially as described.

12. An exciter for an alternating-current dynamo-electric machine comprising in combination means for creating a rotary field of constant magnitude, means for creating a rotary field varying in magnitude and phase with the variations of volume and phase of the current supplied by the alternator, and a generating-winding in the inductive influence of both fields, substantially as described.

13. An exciter-dynamo for dynamo-electric machines comprising in combination a series coil and a shunt-coil, both energized by alternating currents, a generating-coil so wound as to be in inductive relation to both the series coil and the shunt-coil, means for closing the magnetic circuits, a compensating winding, a commutator, and brushes, substantially as described.

14. A rotary transformer comprising two cores each provided with a winding connected to a source of alternating current, a third winding in inductive relation thereto, a commutator, connections from the third winding to the commutator, brushes bearing on the commutator, means for causing a relative rotation between the commutator and the brushes, and a second core for closing the magnetic circuit of the two cores, substantially as described.

15. A rotary transformer comprising two cores each provided with a winding connected to a source of alternating current, a third winding in inductive relation thereto, a commutator, connections from the third winding to the commutator, brushes bearing on the commutator, means for causing a relative rotation between the commutator and the brushes, and a second core for closing the magnetic circuit of the two cores, and a compensating winding on said second core, substantially as described.

16. A rotary transformer comprising two primary windings each on a separate magnetic circuit, and a secondary winding common to both, and connected to a commutator and brushes and means for rotating the windings and the commutator, substantially as described.

17. The method of exciting an alternating-current machine, which consists in charging its field circuit or circuits with current derived from the vector sum of electromotive forces normally acting in quadrature one of which is proportioned to the current in the armature of the machine and the other to the pressure at a predetermined point of the external circuit, substantially as described.

18. The method of regulating an alternating-current generator for constant potential at any point of the line-circuit, which consists in exciting the field of the generator, from moment to moment, under variations of load, by currents derived from the vector sum of electromotive forces, normally acting in quadrature, one of which is proportional to the load and the other to the pressure at the machine-terminals, substantially as described.

19. The method of regulating an alternating-current generator for constant potential at any predetermined point of the line-circuit, and for all angles of current lag, which consists in exciting the field of the generator, from moment to moment, under variations of load by currents derived from the vector sum of electromotive forces, making a vector angle equal to the complement of the angle of lag, one of the electromotive forces being proportional to the load and the other to the pressure at the desired point of the line, substantially as described.

20. An exciter for an alternating-current dynamo-electric machine comprising a series coil and a shunt-coil, a generating-coil so wound as to be in inductive relation to the series and shunt coils and a coil compensating for the reaction of the generating-coil, substantially as described.

21. The combination of an alternating-current dynamo-machine and an exciter-dynamo therefor comprising a series coil and a shunt-coil, a generating-coil so wound as to be in inductive relation with the series and shunt coils and a coil compensating for the reaction of the generating-coil, substantially as described.

22. An alternating-current machine having a relatively large amount of copper on the armature and consequent large armature reaction, in combination with an exciter delivering to the field-winding of the machine currents derived from the vector sum of electromotive forces normally acting in quadrature, one of which is proportional to the current on the armature of the machine and the other to the pressure at a desired point in the external circuit, substantially as described.

23. The combination of an alternator and an exciter therefor comprising two independent fields, one field being practically constant in magnitude and phase and the other varying in magnitude and phase with a current in the alternator-armature, and a generator-winding within the inductive influence of both fields, substantially as described.

24. The method of exciting and regulating an alternating-current machine, which consists in charging its field circuit or circuits with currents derived from the vector sum of two magnetomotive forces, normally at an angle, one of which is proportional to the current strength in the armature of the machine, and the other to the pressure at a predetermined point of the external circuit, substantially as described.

25. The method of regulating an alternating-current generator for constant potential at any point of the line-circuit, which consists in exciting the field of the generator, from moment to moment, under variations of load, by currents derived from the vector sum of two magnetomotive forces, one of which is proportional to the load and the other to the pressure at the machine-terminals, substantially as described.

26. The method of regulating an alternating-current generator for constant potential at any predetermined point of the line-circuit, and for all angles of current lag or lead, which consists in exciting the field of the generator, from moment to moment under variations of load, by currents derived from the vector sum of two magnetomotive forces making a vector angle equal to the complement of the angle of lag or lead, one of the magnetomotive forces being proportional to the load, and the other to the pressure at the desired point of the line, substantially as described.

In testimony whereof we have signed our names to this specification in the presence of two subscribing witnesses.

MAURICE HUTIN.
MAURICE LEBLANC.

Witnesses as to signature of Maurice Hutin:
HENRY J. WELDE,
FRED. P. WARREN.

Witnesses as to signature of Maurice Leblanc:
EDWARD P. MACLEAN,
PAUL BOUR.